United States Patent
Lee et al.

(10) Patent No.: US 12,511,319 B2
(45) Date of Patent: Dec. 30, 2025

(54) METHOD AND APPARATUS WITH ENTITY LINKING

(71) Applicant: Samsung Electronics Co., Ltd., Suwon-si (KR)

(72) Inventors: Jangsu Lee, Suwon-si (KR); Jehun Jeon, Suwon-si (KR); Jiseung Jeong, Suwon-si (KR); Inkyu Choi, Suwon-si (KR); Gyubum Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/464,689

(22) Filed: Sep. 11, 2023

(65) Prior Publication Data

US 2024/0176806 A1 May 30, 2024

(30) Foreign Application Priority Data

Nov. 30, 2022 (KR) .......................... 10-2022-0164634

(51) Int. Cl.
*G06F 16/334* (2025.01)
*G06F 16/3329* (2025.01)
*G06F 16/3332* (2025.01)
*G06F 16/35* (2025.01)

(52) U.S. Cl.
CPC ........ *G06F 16/334* (2019.01); *G06F 16/3329* (2019.01); *G06F 16/3334* (2019.01); *G06F 16/3344* (2019.01); *G06F 16/35* (2019.01)

(58) Field of Classification Search
CPC .............. G06F 16/334; G06F 16/3344; G06F 16/3334; G06F 16/35

USPC ......................................................... 707/726
See application file for complete search history.

(56) References Cited

U.S. PATENT DOCUMENTS

| | | | |
|---|---|---|---|
| 9,852,177 B1* | 12/2017 | Cheung | G06F 16/245 |
| 11,386,096 B2 | 7/2022 | Malik et al. | |
| 2017/0316775 A1* | 11/2017 | Le | G06F 16/3329 |
| 2018/0144234 A1* | 5/2018 | Devesa | G06F 16/90332 |
| 2020/0125673 A1* | 4/2020 | Aharonov | G06F 16/3334 |
| 2022/0222441 A1* | 7/2022 | Liu | G06F 40/35 |

(Continued)

FOREIGN PATENT DOCUMENTS

| | | |
|---|---|---|
| CN | 107783973 A | 3/2018 |
| CN | 113761218 A | 12/2021 |
| EP | 3 859 559 A2 | 8/2021 |

(Continued)

OTHER PUBLICATIONS

Kolitsas et al. "End-to-End Neural Entity Linking" *arXiv preprint arXiv:1808.07699*, Aug. 29, 2018 (pp. 1-15).

(Continued)

*Primary Examiner* — Shahid A Alam
(74) *Attorney, Agent, or Firm* — NSIP Law

(57) ABSTRACT

Disclosed is an entity linking method. A method includes: extracting an entity from an input context including text stored in a memory; obtaining candidate entities corresponding to, and based on, the extracted entity; determining a keyword based on the input context; generating keyword-based entity information based on the keyword and based on the extracted entity; and determining a top-matching entity corresponding to the entity based on the keyword-based entity information and the plurality of candidate entities.

14 Claims, 8 Drawing Sheets

(56) References Cited

U.S. PATENT DOCUMENTS

2022/0277738 A1* 9/2022 Aher .................. G06F 16/433
2023/0259809 A1* 8/2023 Singh .................. G06F 16/93
                                                        706/12

FOREIGN PATENT DOCUMENTS

JP     2022-040026 A    3/2022
KR     10-2022-0085489 A  6/2022
KR     10-2022-0087704 A  6/2022

OTHER PUBLICATIONS

Ravi et al. "CHOLAN: A Modular Approach for Neural Entity Linking on Wikipedia and Wikidata" *arXiv preprint arXiv:2101.09969*, Feb. 8, 2021 (pp. 1-11).
Zhang et al. "ENTQA: Entity Linking as Question Answering" *arXiv preprint arXiv:2110.02369*, Mar. 7, 2022 (pp. 1-13).
Extended European search report issued on Feb. 28, 2024, in counterpart European Patent Application No. 23201136.1 (8 pages).

* cited by examiner

METHOD AND APPARATUS WITH ENTITY LINKING

CROSS-REFERENCE TO RELATED APPLICATIONS

This application claims the benefit under 35 USC § 119(a) of Korean Patent Application No. 10-2022-0164634, filed on Nov. 30, 2022, in the Korean Intellectual Property Office, the entire disclosure of which is incorporated herein by reference for all purposes.

BACKGROUND

1. Field

The following disclosure relates to an apparatus and method with entity linking, and more specifically, to entity linking using keyword information.

2. Description of Related Art

Entity linking may involve determining the best meaning of a word (when the word may have different meanings) in consideration of its usage in a given document or context and linking the word to a person, an object, or a place, for example, according to the determined best meaning. Entity linking may be used in applications such as search engines or conversation systems where the determined meaning of a polysemous word affects quality of the applications.

Conventionally, entity linking for a word was performed by calculating features (usually in the form of a feature vector) around the word (i.e., near the word in a document, speech, etc.) and then applying the features/vector to a support vector machine (SVM), logistic regression, a similarity analysis, or the like. However, when the number of named entities to be discriminated increases, the conventional arts may require more time and have difficulty in obtaining accurate results compared to the time taken. In particular, hundreds to thousands of named entities to be discriminated may be used in a search engine where not only a few specific words but also multiple polysemous words are used, and the conventional arts may exhibit significantly poor entity linking accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes: extracting an entity from an input context including text stored in a memory; obtaining candidate entities corresponding to, and based on, the extracted entity; determining a keyword based on the input context; generating keyword-based entity information based on the keyword and based on the extracted entity; and determining a top-matching entity corresponding to the entity based on the keyword-based entity information and the plurality of candidate entities.

The determining of the top-matching entity may include calculating similarities between the keyword-based entity information and the candidate entities, respectively; and determining a candidate entity having the highest similarity to be the top-matching entity.

The extracting of the entity may include obtaining a token embedding sequence and an entity span from the input context; and determining the entity from the entity span.

The determining of the keyword may include extracting related information based on the token embedding sequence and the entity span.

The determining of the keyword may further include determining an entity span to be the keyword based on a similarity between an embedding vector corresponding to the related information and an embedding vector of the entity span being greater than a predetermined threshold.

The keyword may be determined by inputting the input context to a keyword extraction module.

The candidate entities may obtained from an entity-candidate prior dictionary according to the entity.

The method may further include extracting embedding vectors of the respective candidate entities based on a candidate embedding database including embeddings respectively associated with entities.

The generating of the keyword-based entity information may include generating the keyword-based entity information by inputting the keyword and the entity into a keyword-based entity information encoder.

In another general aspect, an entity linking apparatus may including: one or more processors; a memory storing instructions configured to cause the one or more processors to: extract an entity based on an input context including text, obtain candidate entities corresponding to, and based on, the extracted entity, determine a keyword corresponding to the input context, generate keyword-based entity information based on the keyword and the entity, and determine a top-matching entity corresponding to the entity based on the keyword-based entity information and the plurality of candidate entities.

The instructions may be further configured to cause the one or more processors to: calculate similarities between the keyword-based entity information and candidate entities, respectively, and determine a candidate entity having the highest similarity to be the top-matching entity.

The instructions may be further configured to cause the one or more processors to obtain a token embedding sequence and an entity span corresponding to the input context, and determine the entity from the entity span.

The instructions may be further configured to cause the one or more processors to extract related information based on the token embedding sequence and the entity span.

The instructions may be further configured to cause the one or more processors to determine an entity span to be the keyword responsive to determining that a similarity between an embedding vector corresponding to the related information and an embedding vector of the entity span is greater than a predetermined threshold.

The instructions may be further configured to cause the one or more processors to determine the keyword by inputting the input context to a keyword extraction module.

The instructions may be further configured to cause the one or more processors to determine the candidate entities corresponding to the entity based on an entity-candidate prior dictionary.

The instructions may be further configured to cause the one or more processors to extract embedding vectors of the candidate entities based on a candidate embedding database.

The instructions may be further configured to cause the one or more processors to generate the keyword-based entity information by inputting the keyword and the entity into a keyword-based entity information encoder.

In another general aspect, a method includes: providing an input text to a model that identifies, from the input text, an entity in the input text; based on the identified entity, obtain, from a database, candidate entity embeddings corresponding to the identified entity, the database including associations between entities and entity embeddings; determining a keyword based on the input text and based on the identified entity; generating a keyword-based embedding vector based on the keyword and based on the identified entity; generating similarities between the keyword-based embedding vector and the candidate entity embeddings; and selecting the candidate entity embedding with the highest similarity score to link to the entity.

The entity may be identified based on a language model and a mention detection model, and the key information encoder may include a neural network.

Other features and aspects will be apparent from the following detailed description, the drawings, and the claims.

Figure 1:
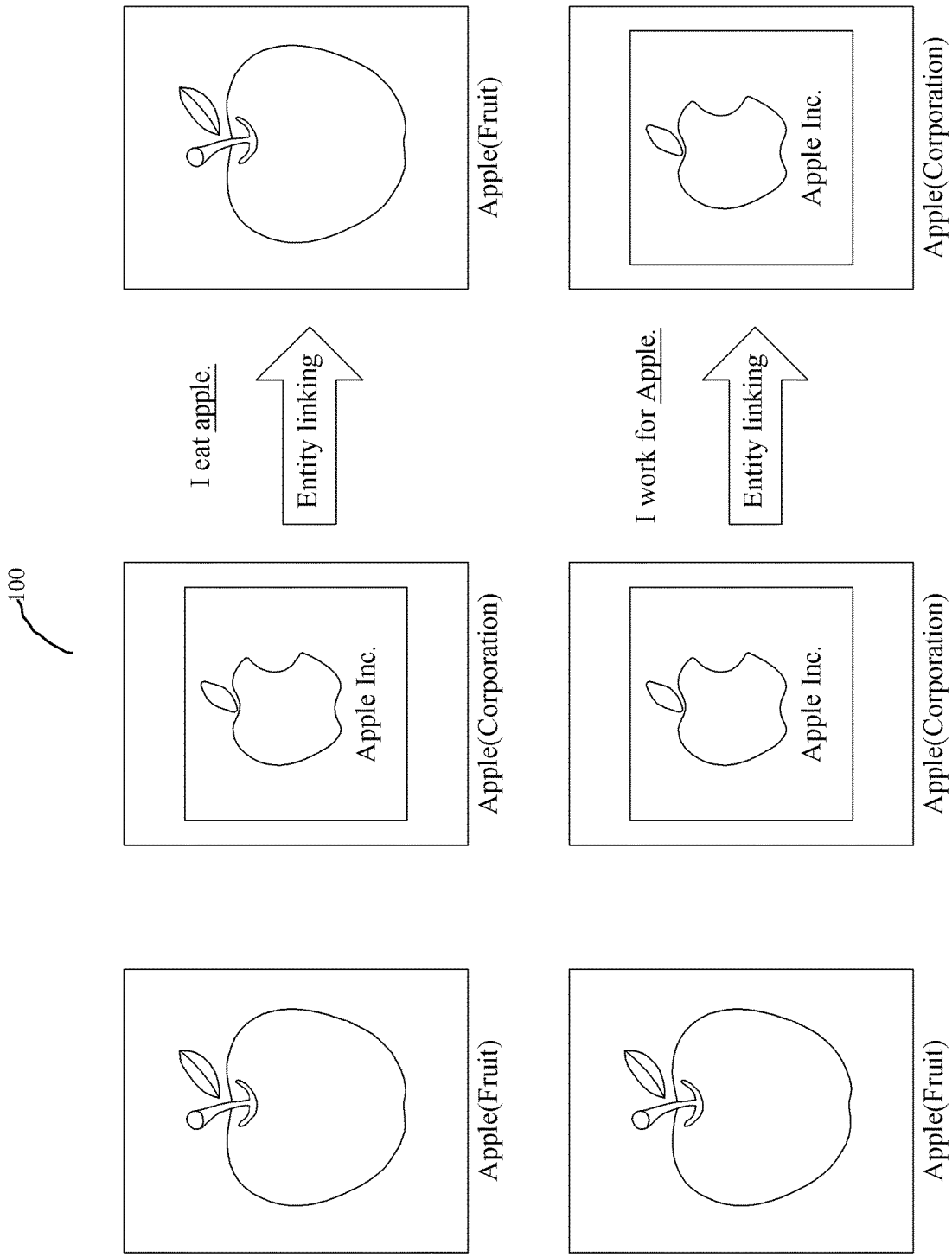
FIG. 1 illustrates an example of entity linking, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example 100 of entity linking, according to one or more embodiments.

Referring to FIG. 1, an entity linking system may perform entity linking for a polysemous word positioned in a text including one or more sentences included in a document (a document example is described herein, but embodiments may be applied to any type of text setting, e.g., text from speech). Entity linking may be performed by an entity linking apparatus configured using dedicated hardware for entity linking. The entity linking apparatus may also access, store, manipulate, process, and create data in response to execution of natural language processing software in the form of processor-executable instructions. Such natural language processing software may be, for example, chats, chat bots, conversation engines, search engines, or the like. The entity linking apparatus may be, or may be included in, any digital device that includes a memory means and a microprocessor and has a computation capability, such as a tablet personal computer (PC), a smartphone, a PC (e.g., a notebook computer, etc.), a smart television (TV), a mobile phone, a navigation device, a web pad, a personal digital assistant (PDA), a workstation, or the like. In addition, the entity linking apparatus may be included in a server, a cloud service, etc.

An entity may be any piece of information referenced by a word or phrase in in a sentence and may have various meanings depending on the context of the reference. For example, the word "apple" may refer to the specific entity that is a fruit "apple" or the specific entity that is the corporation "Apple", depending on the usage or context of "apple". The entity linking system may perform entity linking for a polysemous word (e.g., apple) in a sentence, by determining the most likely correct meaning (specific entity) referenced in the sentence according to the sentence (or similar context), for example. For example, the entity linking system may link "apple" in a sentence saying "I eat apple" to the specific entity "apple(fruit)", and may link "apple" in a sentence saying "I work for Apple" to the specific entity "Apple(corporation)". The entity linking embodiments and techniques described herein may be applied to phrases such as "winter sea" as well as individual words, however, for description, linking to a word may be mostly described, with the understanding that the same description applies to phrases. Also, although a sentence context of a word of an entity is mostly described, the same technique may be applied to a word in any textual context.

Furthermore, the entity linking system may provide (or aid in providing) services to users by reflecting (making use of or providing) entity linking results. More specifically, in a case where a user wants to perform a search for apple (corporation), the entity linking system may provide search results considering the meaning of a search word having multiple meanings, thereby helping the user to obtain desired search results more conveniently.

The entity linking system may find a target entity present in a sentence and link the target entity to a gold entity that is an expression (specific entity) of an accurate meaning. Herein, "gold entity" refers to a selected specific entity that is linked to a target entity, and the term "gold" refers to the specific entity being determined to be a most likely correct specific entity (e.g., a closest, an inferred most-probable, etc.). In other words, a "gold entity" is a specific entity linked to a target entity based on various factors described herein. A process of determining a target entity may be referred to as mention detection (MD), and a process of linking an entity to a gold entity (a specific entity) may be referred to as entity disambiguation (ED).

Entity linking may be performed by comparing (i) an entity embedding vector (e.g., a feature vector of features of the target entity) derived from a language model (LM) configured as a neural network and, for example, by inferring the embedding vector from context of the word of the target entity with (ii) candidate entity embedding vectors.

The language model may be most effective if it is trained so that the entity embedding vectors that it infers for target entities tend to be highly similar to embedding vectors of respective ground gold entities. That is, the language model may generate candidate entity embedding vectors for a given entity, and if well-trained, the language model will be more likely to predict (or find as most probable) a candidate entity embedding vector that is actually correct. Thus, entity linking performance may depend on a method of accurately generating sufficient training information for entity embedding (i.e., training data with a high level of accurate ground truths). Such training data, among other benefits, may be obtained by providing the entity linking system keyword information in a document, which may be used during the entity linking process, as described below.

Figure 2:
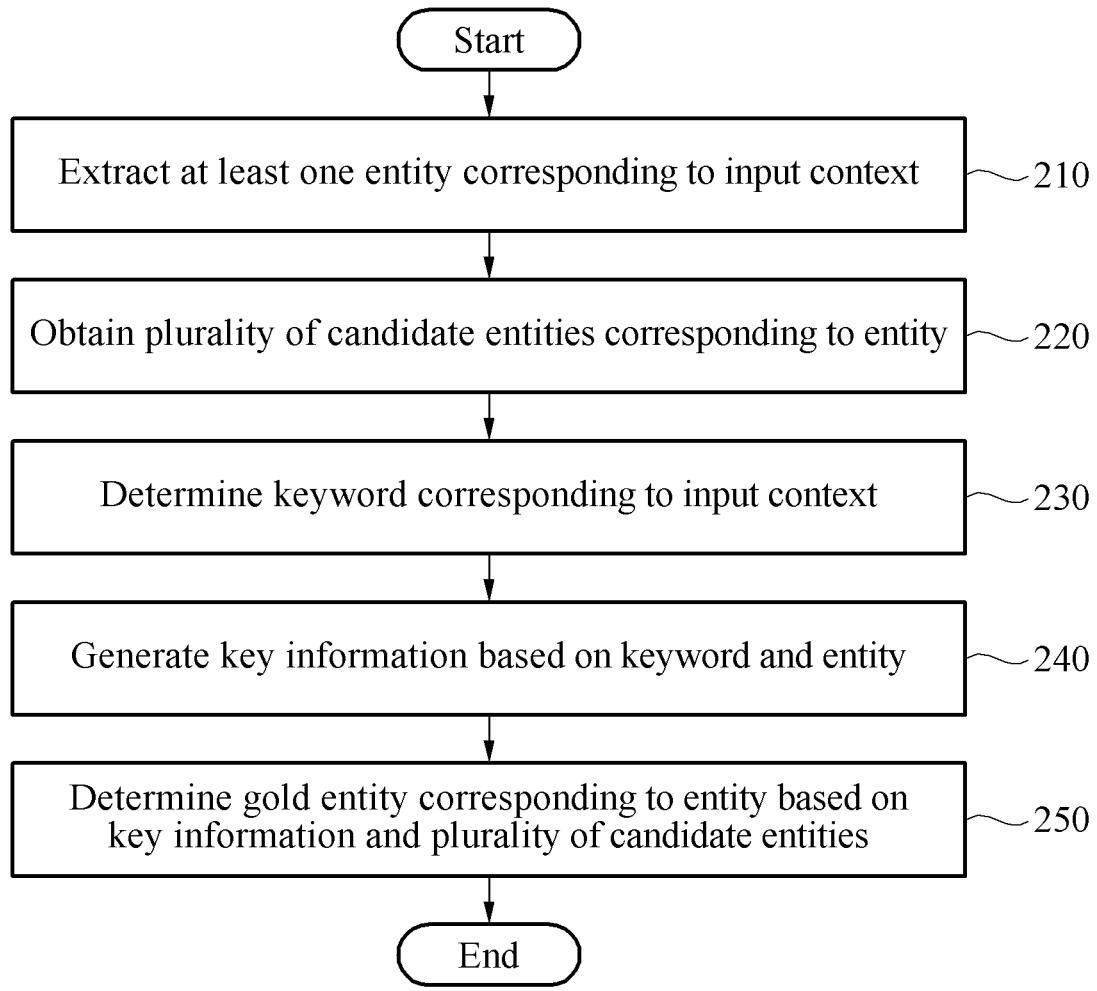
FIG. 2 illustrates an example entity linking method, according to one or more embodiments.

FIG. 2 illustrates an example entity linking method, according to one or more embodiments.

Operations 210 to 250 are described as being performed using the entity linking apparatus of FIG. 7 (or any apparatus described with reference to FIG. 1). However, operations 210 to 250 may be performed by any suitable electronic device and in any suitable system.

Referring to FIG. 2, in operation 210, an entity linking apparatus may extract at least one entity (word thereof) from an input context (e.g., a document containing a word of the entity). The input context may be a unit to be subjected to entity linking processing (described below), and may be, for example, a sentence. However, examples are not limited thereto. For example, the input context may be a phrase, a paragraph, a document of paragraphs, a window of text (e.g., all words within, e.g., 200 words), etc.

Extracting the entity may include extracting a mention. The mention may be a basic input unit for clustering words that refer to the same target to the same entity, which may be done through coreference resolution, for example. A mention usually includes a single noun or noun phrase, and several mentions may exist in a single sentence or single phrase.

In operation 220, the entity linking apparatus may obtain candidate entities corresponding to the entity (here, candidate entities are specific entities with potential to be linked to the entity). The candidate entities may be expressions for respective different meanings related to a surface form (an expression of characters shown on the surface, e.g., a word) of the entity. The candidate entities may be configured in advance in an index dictionary. The entity linking apparatus may receive the candidate entities corresponding to the entity in the dictionary (i.e., given an entity, candidate entities may be looked up in the dictionary via its index). Alternatively, the entity linking apparatus may store information on candidate entities in a memory and may autonomously obtain candidate entities. In another approach, an external service or device may provide candidate entities.

In operation 230, the entity linking apparatus may determine a keyword corresponding to (or based on) the input context. The keyword may reflect implicit information about the input context and may be an entity unit, but examples are not limited thereto. For example, the keyword may be a token unit. The keyword may be extracted or inferred from the input context or from a document including the input context. Determining a keyword may include determining keyword information.

In operation 240, the entity linking apparatus may generate keyword-based entity information based on the keyword and the entity. The keyword-based entity information may have a form that is the same or similar to the candidate entities that allows the keyword-based entity information to be evaluated against the candidate entities. The keyword-based entity information may be generated by encoding the keyword and the entity together. For example, the entity linking apparatus may generate the keyword-based entity information by inputting the keyword and the entity into a pre-trained multilayer perceptron (MLP). However, other methods of generating keyword-based entity information may be used.

In operation 250, the entity linking apparatus may determine (or select), from among the candite entities, a gold entity corresponding to (i.e., to be linked to) the entity based on the keyword-based entity information and the candidate entities. The entity linking apparatus may determine/select the gold entity by computing similarity scores between the keyword-based entity information and the respective candidate entities, and comparing (e.g., ranking) the similarity scores. For example, the entity linking apparatus may calculate similarity scores (e.g., cosine similarities) between an embedding vector of the keyword-based entity information and embedding vectors of the candidate entities, and then determine/select a candidate entity having the highest similarity score to be the gold entity.

The entity linking apparatus' generation of an entity embedding expression using the keyword increase the accuracy of gold entity selection.

Figure 3:
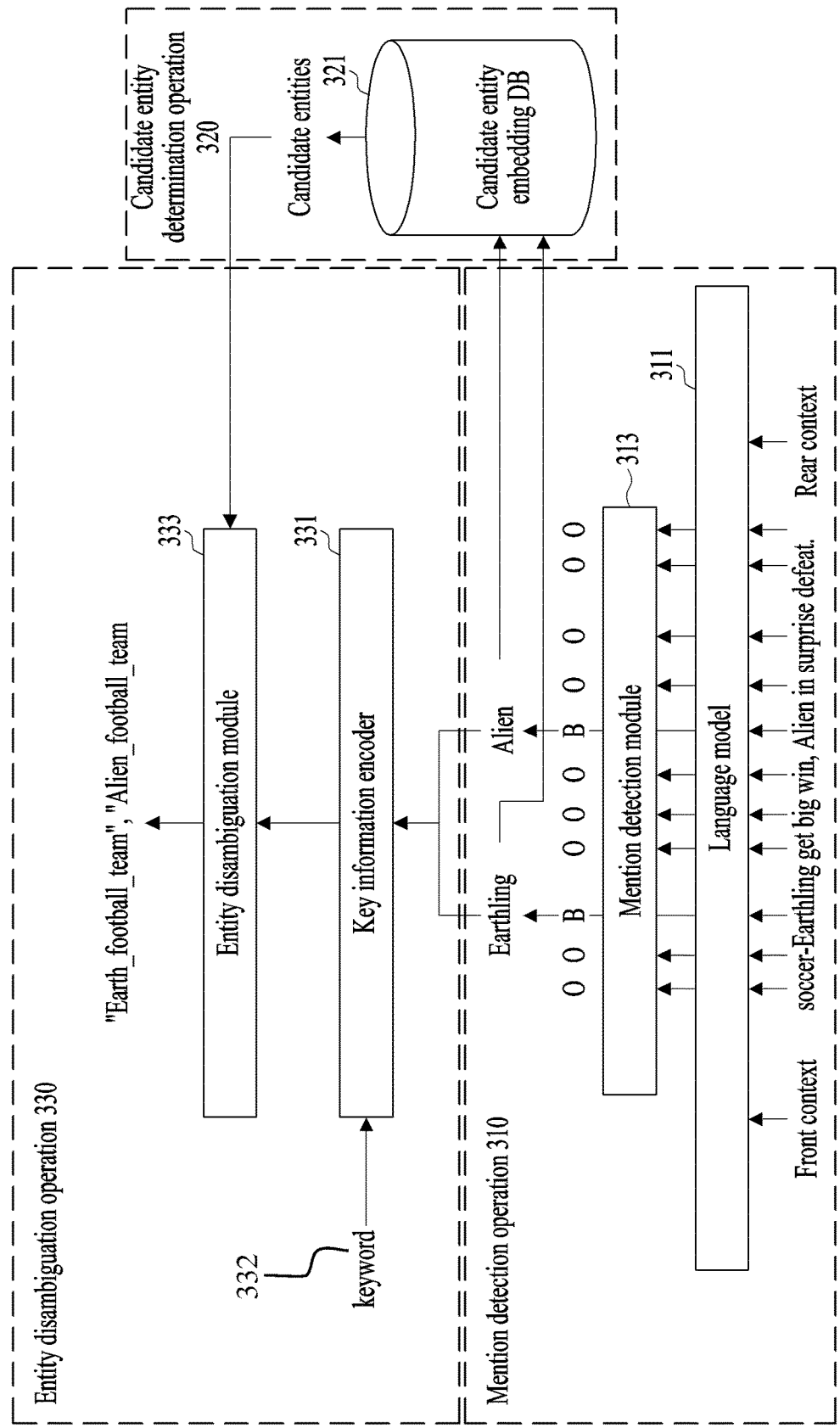
FIG. 3 illustrates an example entity linking method, according to one or more embodiments.

FIG. 3 illustrates an example entity linking method, according to one or more embodiments.

The description provided with reference to FIGS. 1 and 2 may generally apply to the example of FIG. 3.

Referring to FIG. 3, an entity linking method may include mention detection operation 310, candidate entity determination operation 320, and entity disambiguation operation 330. The flow of operations shown in FIG. 3 generally proceeds from the bottom of FIG. 3.

An entity linking apparatus may include a language model 311, a mention detection module 313, a keyword-based entity information encoder 331 (i.e., a key information encoder), and an entity disambiguation module 333. A candidate entity embedding database (DB) 321 may be included with the entity linking apparatus or may be accessed from an external resource.

The term "module" used herein may be, for example, a unit including one or a combination of two or more of hardware, software, or firmware. The "module" may be interchangeably used with terms such as, for example, unit, logic, logical block, component, or circuit. The "module" may be a minimum unit of an integrally formed component or part thereof. The "module" may be a minimum unit for performing one or more functions or part thereof. The "module" may be implemented mechanically or electronically. For example, the "module" may include any one or any combination of an application-specific integrated circuit (ASIC) chip, field-programmable gate arrays (FPGAs), or a programmable-logic device that performs known operations or operations to be developed. The division of methods/processes described herein into various modules is for convenience and the functions, operations, etc., may be arranged in different ways using different modules.

Further, not all of the components shown in FIG. 3 are essential components of the entity linking apparatus. The entity linking apparatus may be implemented by more or fewer components than the illustrated components.

Mention detection operation 310 may be learned (i.e., model(s) thereof trained) and operated separately from entity disambiguation operation 330, or may be learned and operated by a single model through an end-to-end method together with entity disambiguation operation 330.

In the mention detection operation 310, the language model 311 may receive an input context or a preprocessed input context (e.g., tokens mentioned next) and output (generate) an entity embedding vector based thereon. The input context may be, for example, "Soccer-Earthling get big win, Alien in surprise defeat.". The language model 311 may be implemented as, for example, a Bidirectional Encoder Representations from Transformers (BERT) model, a Robustly Optimized BERT Approach (RoBERTa model), or the like.

The entity linking apparatus may further include a preprocessing module (not shown), and the preprocessing module may parse the input context into tokens after refinements such as special character removal, whitespace deletion, etc.

The entity embedding vector may include context representation information and position information. The position information may be referred to as position embedding, and may be information (e.g., in the form of a vector) that indicates how far an entity is from other entities in the input context.

The mention detection module 313 may receive the entity embedding vector and extract entities (e.g., "Earthling" and "Alien") from the input context ("Soccer-Earthling get big win, Alien in surprise defeat."). As described above, extracting an entity may include extracting a mention. The mention detection module 313 may include an artificial neural network model that is trained to receive an entity embedding vector and extract an entity from an input context.

The artificial neural network model provided in the mention detection module 313 (hereinafter, a mention detection model) may be trained based on a tagging system. For example, the mention detection model may be trained by labeling a span of a mention to be extracted with B (Begin), I (Inside), and O (Outside). The span of the mention may be a set of candidates for the mention. For example, the mention detection model may learn generally in a manner used in Named Entity Recognition (NER), and may learn as a single model using an end-to-end method that learns together with entity disambiguation (as shown in FIG. 3) or may learn and operate as an independent model according to the implementation. As noted above, the learning method of NER learns and infers by labeling a span of a mention to be extracted with Begin (B), Inside (I), and Outside (O). However, the method of training the mention detection model is not limited to the above example.

In the candidate entity determination operation 320, the entity linking apparatus may obtain a list of candidate entities for each respective entity detected in the mention detection operation 310. For example, a list of candidate entities for an input entity may be obtained from an entity-candidate prior dictionary (not shown). The initial list may be a list of specific entities (e.g., "apple(fruit)" and "apple (corporation)") that the dictionary associates with the input entity. The entity linking apparatus may extract candidate entity embedding vectors respectively corresponding to the candidate entities (e.g., the members of the initial list of candidate entities from the dictionary) from the candidate entity embedding DB 321. The candidate entity embedding DB 321 may be constructed based on various methods. For example, the candidate entity embedding DB 321 may be constructed using candidate entity embedding vectors generated using the wiki2vec algorithm. However, the method of constructing the embedding vectors of the candidate entity embedding DB 321 is not limited to the above example.

In entity disambiguation operation 330, a keyword extraction module (not shown) may determine a keyword 332 corresponding to the input context. The keyword-based entity information encoder 331 may generate keyword-based entity information based on the keyword 332 and the entity provided by the mention detection operation 310 (the same entity processed by the candidate entity determination operation 320). A method of generating keyword-based entity information is described with reference to FIGS. 4 to 6.

The entity disambiguation module 333 may determine gold entities (e.g., "Earth_football_team" and "Alien_football_team") respectively corresponding to the entities ("Earthling" and "Alien"). For a target entity, the entity disambiguation module 333 may determine/select a gold entity based on (i) the keyword-based entity information of the target entity (e.g., a keyword-based embedding vector of the target entity) from the keyword-based information encoder 331 and (ii) the candidate entities (e.g., candidate embedding vectors of the target entity) from the candidate entity determination operation 320. As described below, the candidate entity that is determined to be most similar to the keyword-based entity information may be selected as the gold entity to be entity-linked to the target entity.

Figure 4:
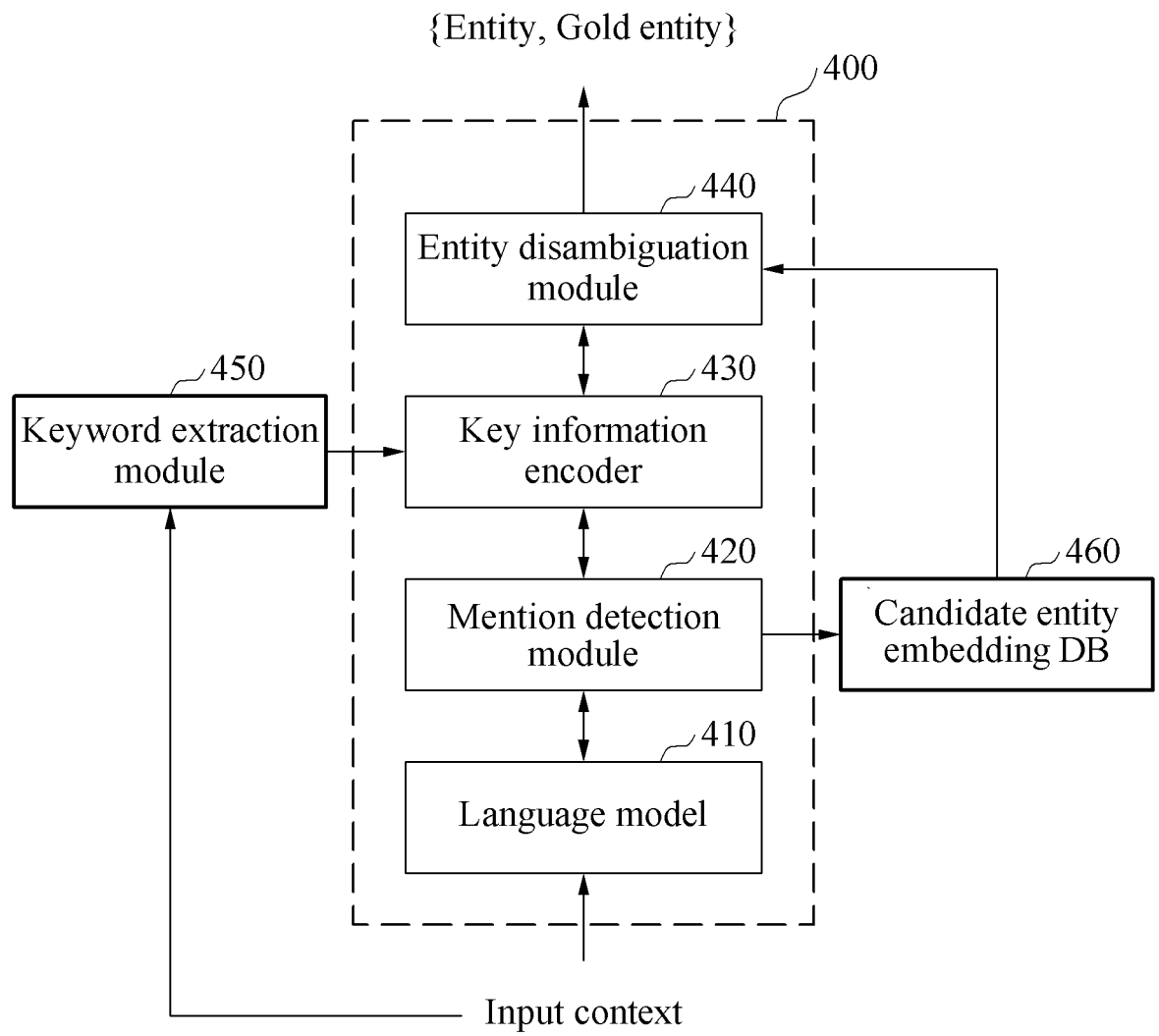
FIG. 4 illustrates an example entity linking method using an external keyword extraction module, according to one or more embodiments.

FIG. 4 illustrates an example entity linking method using an external keyword extraction module, according to one or more embodiments.

The description provided with reference to FIGS. 1 to 3 is generally applicable to the example of FIG. 4.

Referring to FIG. 4, an entity linking apparatus may receive an input context and based thereon output one or more entities and gold entities corresponding to the respective entities. The entity linking apparatus may include an entity linking model 400, a keyword extraction module 450, and a candidate entity embedding DB 460. The entity linking model 400 may include a language model 410, a mention detection module 420, a keyword-based entity information encoder 430 and an entity disambiguation module 440.

However, the entity linking apparatus is merely illustrated as being divided into the language model 410, the mention detection module 420, the keyword-based entity information encoder 430, the entity disambiguation module 440, the keyword extraction module 450, and the candidate entity embedding DB 460 in order to describe the operations respectively corresponding to the components; the linking apparatus may not be physically and clearly divided into the particular components. For example, the operation of the entity linking apparatus may be performed by at least one processor.

As described above, the entity linking apparatus may train and operate a single end-to-end entity linking model 400 through an end-to-end method. For example, the entity linking model 400 may be trained based on an input context labeled with a ground truth gold entity. More specifically, a loss function may be determined based on a difference between a gold entity obtained by inputting the input context to the entity linking model 400 and the ground truth gold entity, and parameters (e.g., weights) of the entity linking model 400 may be trained through backpropagation such that the loss function is minimized.

In FIG. 4, the double-headed arrows between the language model 410, the mention detection module 420, the keyword-based entity information encoder 430, and the entity disambiguation module 440 of the entity linking model 400 indicate bidirectional interaction of a path along which training-related data is transmitted toward the output side during training and a path of backpropagation of a calculated loss of the entity disambiguation module 440.

The keyword extraction module 440 and the candidate entity embedding DB 460 may be external modules that are independent of the entity linking model 400. The keyword extraction module 440 may receive the input context, extract an important keyword, and transmit the keyword to the keyword-based entity information encoder 430. The keyword extraction module 440 may be based on a neural network model, and in this case, the neural network model of the keyword extraction module 440 may learn and operate separately from the entity ranking model 400. Alternatively, the keyword extraction module 440 may operate based on rules, and may extract the keyword using various keyword extraction algorithms.

Figure 5A:
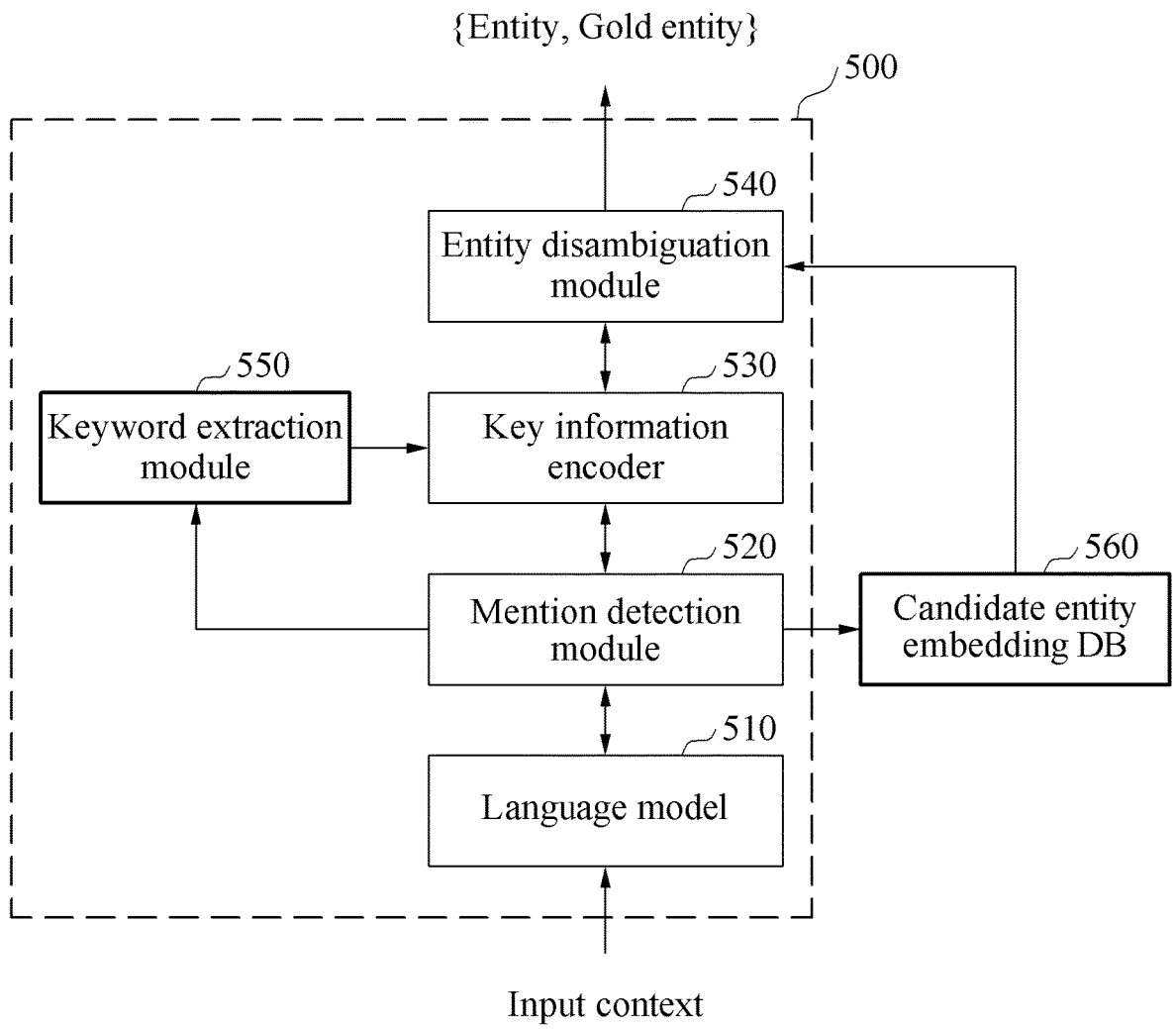
FIGS. 5A and 5B illustrate an example entity linking method using an internal keyword extraction module included in an entity linking model, according to one or more embodiments.
Figure 5B:
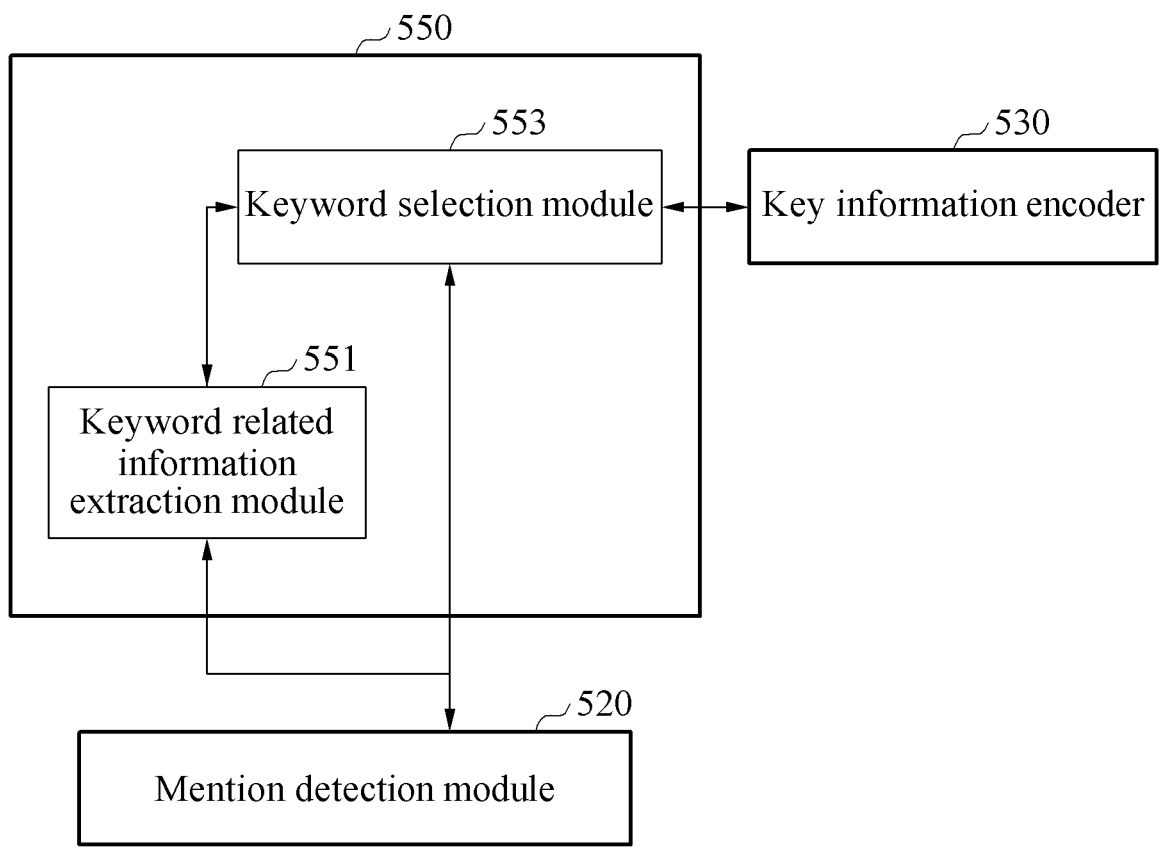

FIGS. 5A and 5B illustrate an example entity linking method using an internal keyword extraction module included in an entity linking model, according to one or more embodiments.

The description provided with reference to FIGS. 1 to 4 generally applies to the example of FIGS. 5A and 5B.

Referring to FIG. 5A, an entity linking apparatus may receive an input context and output one or more entities and gold entities corresponding to the respective entities. The entity linking apparatus may include an entity linking model 500 and a candidate entity embedding DB 560. The entity linking model 500 may include a language model 510, a mention detection module 520, a keyword-based entity information encoder 530, an entity disambiguation module 540, and a keyword extraction module 550.

The mention detection module 520 may obtain a token embedding sequence and an entity span corresponding to the input context. The keyword extraction module 550 may receive the token embedding sequence and the entity span and output a keyword based thereon.

Referring to FIG. 5B, the keyword extraction module 550 may include a keyword related information extraction module 551 and a keyword selection module 553. The keyword related information extraction module 551 may receive the token embedding sequence and the entity span and extract related information. The related information may be a topic, a title, a main sentence, and the like, and a variety of information to be extracted may be added as needed.

The keyword related information extraction module 551 may extract keyword related information using a neural network model, and in this case, may be trained together with the other elements of the entity linking model 500. For example, the keyword related information extraction module 551 may be trained to extract the related information corresponding to the input context. To this end, a [CLS] (classification) token positioned at the beginning of an input token sequence may be used as an embedding representing a document. In the case of a document in which representative information (e.g., title) is explicitly included or available, a corresponding entity span may be extracted, and a corresponding embedding sequence may be used to train the artificial neural network model. Also, the keyword related information extraction module 551 may extract the related information based on a rule-based algorithm.

The keyword selection module 553 may select a keyword from the input context in consideration of the extracted keyword related information. For example, the keyword selection module 533 may select an entity span having an embedding vector similar to an embedding vector of the related information as the keyword. However, the method of selecting the keyword is not limited to the above example.

Figure 6:
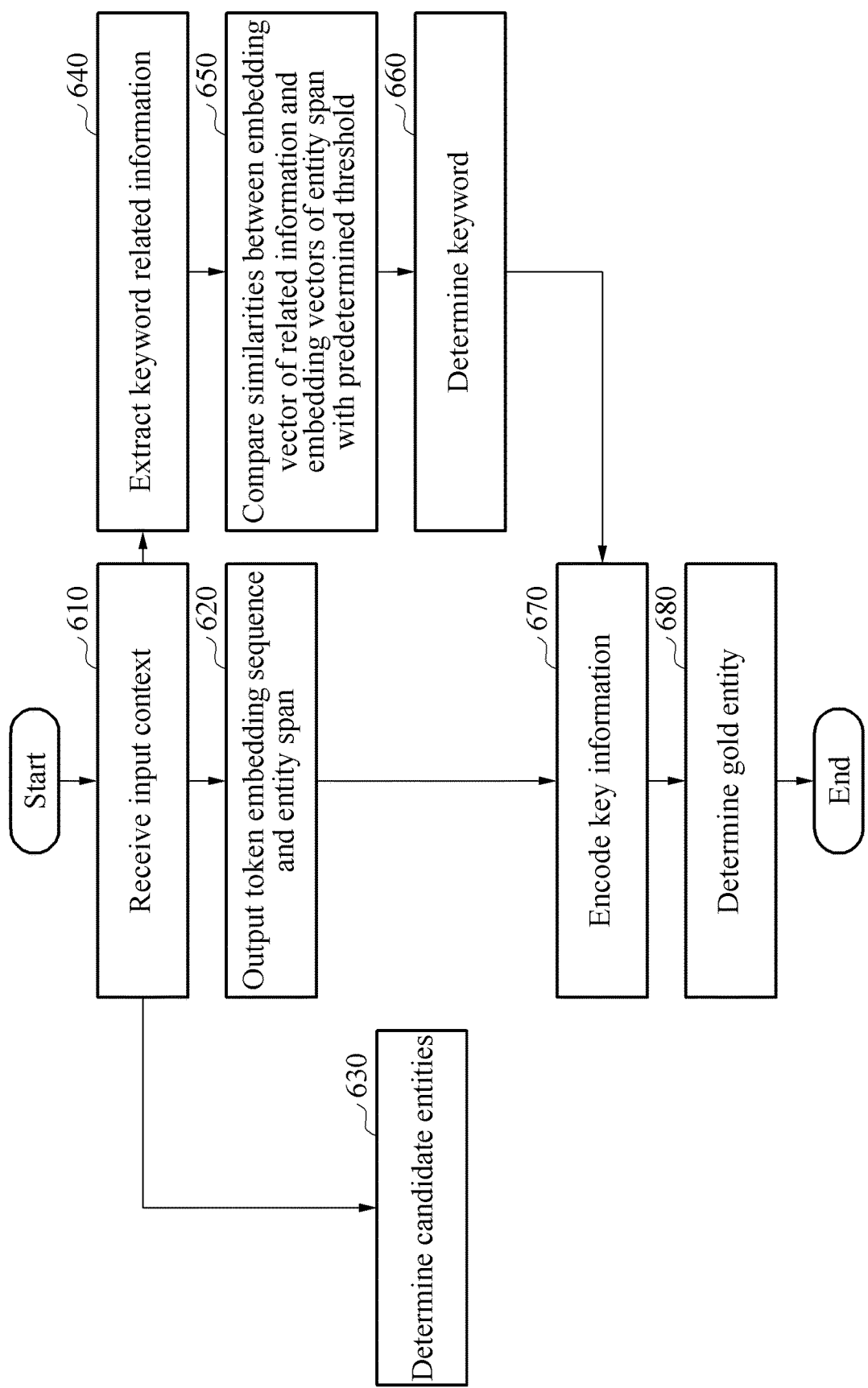
FIG. 6 illustrates an example entity linking method, according to one or more embodiments.

FIG. 6 illustrates an example entity linking method, according to one or more embodiments.

Operations 610 to 680 are described as being performed using the entity linking apparatus described with reference to FIGS. 5A and 5B. However, operations 610 to 680 may be performed by any suitable electronic device and in any suitable system.

In operation 610, the language model 510 may receive an input context and generate an embedding vector based thereon.

In operation 620, the mention detection module 520 may receive the embedding vector from the language model 510 and output a token embedding sequence and an entity span.

In operation 630, the entity linking apparatus may determine an entity (a target entity) from the entity span output from the mention detection module 520, and determine candidate entities for the entity (target entity) using the candidate entity embedding DB 560.

In operation 640, the keyword related information extraction module 551 may receive the token embedding sequence and the entity span and extract the key related information.

In operation 650, the keyword selection module 553 may compare similarities between an embedding vector of the related information and embedding vectors of the entity span with a predetermined threshold.

In operation 660, the keyword selection module 553 may determine an entity span to be the keyword, when a similarity between the embedding vector of the related information and an embedding vector of the entity span is greater than or equal to the predetermined threshold.

In operation 670, the keyword-based entity information encoder 530 may generate keyword-based entity information based on the entity and the keyword.

In operation 680, the entity disambiguation module 540 may determine a gold entity to be linked to the target entity by comparing similarities between an embedding vector of the keyword-based entity information and candidate entity embedding vectors. For example, the entity disambiguation module 540 may compare the similarities between the embedding vector of the keyword-based entity information and the candidate entity embedding vectors, and determine/select a candidate entity having the highest similarity to be the gold entity.

Figure 7:
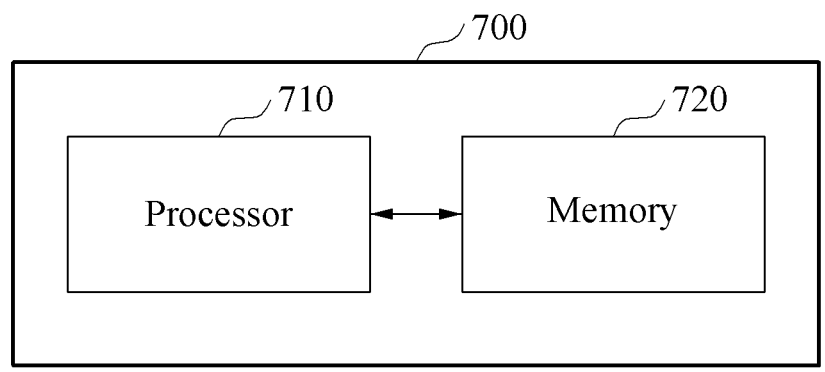
FIG. 7 illustrates an example configuration of an entity linking apparatus, according to one or more embodiments.

FIG. 7 illustrates an example configuration of an entity linking apparatus, according to one or more embodiments. The description provided with reference to FIGS. 1 to 6 is generally applicable to the example of FIG. 7.

Referring to FIG. 7, an entity linking apparatus 700 may include at least one processor 710 and a memory 720.

The memory 720 may store computer-readable instructions. When the instructions stored in the memory 720 are executed by the processor 710, the processor 710 may process operations defined by the instructions. The memory 720 may include, for example, random-access memory (RAM), dynamic random-access memory (DRAM), static random-access memory (SRAM), or other types of non-volatile memory known in the art. The memory 720 may store a pre-trained artificial neural network model.

The at least one processor 710 may control the overall operation of the entity linking apparatus 700. The processor 710 may be a hardware-implemented apparatus having a circuit that is physically structured to execute desired operations. The desired operations may include code or instructions included in a program. The hardware-implemented apparatus may include, but is not limited to, for example, a microprocessor, a central processing unit (CPU), a graphics processing unit (GPU), a processor core, a multi-core processor, a multiprocessor, an application-specific integrated circuit (ASIC), a field-programmable gate array (FPGA), and/or a neural processing unit (NPU).

The processor 710 may extract at least one entity corresponding to an input context, obtain a plurality of candidate entities corresponding to the entity, determine a keyword corresponding to the input context, generate keyword-based entity information based on the keyword and the entity, and determine a gold entity corresponding to the entity based on the keyword-based entity information and the plurality of candidate entities.

The computing apparatuses, the models, the databases, the electronic devices, the processors, the memories, the displays, the information output system and hardware, the storage devices, and other apparatuses, devices, units, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RW, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An entity linking method, comprising:
   extracting, by a trained neural network language model executed by one or more processors, an entity from an input context comprising text stored in a memory, the trained neural network language model being a neural network-based language model trained and configured to provide, as an output, the entity extracted from the input context;
   obtaining, by the one or more processors, candidate entities corresponding to, and based on, the extracted entity;
   determining, by the one or more processors, a keyword based on the input context;
   generating, by the one or more processors, keyword-based entity information by encoding the keyword together with the extracted entity; and
   determining, by the one or more processors, from among the candidate entities, a top-matching entity corresponding to the entity based on the keyword-based entity information and the candidate entities,
   wherein the extracting of the entity comprises:
   obtaining a token embedding sequence and an entity span from the input context; and
   determining the entity from the entity span,
   wherein the determining of the keyword comprises extracting related information based on the token embedding sequence and the entity span, and
   wherein the determining of the keyword further comprises determining an entity span to be the keyword based on a similarity between an embedding vector corresponding to the related information and an embedding vector of the entity span being greater than a predetermined threshold.

2. The entity linking method of claim 1, wherein
   the determining of the top-matching entity comprises:
   calculating similarities between the keyword-based entity information and the candidate entities, respectively; and
   determining a candidate entity having the highest similarity to be the top-matching entity.

3. The entity linking method of claim 1, wherein the keyword is determined by inputting the input context to a keyword extraction module.

4. The entity linking method of claim 1, wherein the candidate entities are obtained from an entity-candidate prior dictionary according to the entity.

5. The entity linking method of claim 1, further comprising: extracting embedding vectors of the respective candidate entities based on a candidate embedding database comprising embeddings respectively associated with entities.

6. The entity linking method of claim 1, wherein the generating of the keyword-based entity information comprises generating the keyword-based entity information by inputting the keyword and the entity into a keyword-based entity information encoder.

7. An entity linking apparatus, comprising:
one or more processors;
a memory storing instructions configured to cause the one or more processors to:
extract an entity based on an input context comprising text using a neural network-based language model, the neural network-based language model being trained and configured to provide, as an output, the extracted entity from the input context,
obtain candidate entities corresponding to, and based on, the extracted entity,
determine a keyword corresponding to the input context,
generate keyword-based entity information, the keyword-based information comprising a combined encoding of the keyword and the entity, and
determine a top-matching entity corresponding to the entity based on the keyword-based entity information and the candidate entities,
wherein the extracting of the entity comprises:
obtaining a token embedding sequence and an entity span from the input context; and
determining the entity from the entity span,
wherein the determining of the keyword comprises extracting related information based on the token embedding sequence and the entity span, and
wherein the determining of the keyword further comprises determining an entity span to be the keyword based on a similarity between an embedding vector corresponding to the related information and an embedding vector of the entity span being greater than a predetermined threshold.

8. The entity linking apparatus of claim 7, wherein the instructions are further configured to cause the one or more processors to:
calculate similarities between the keyword-based entity information and candidate entities, respectively, and
determine a candidate entity having the highest similarity to be the top-matching entity.

9. The entity linking apparatus of claim 7, wherein the instructions are further configured to cause the one or more processors to:
determine the keyword by inputting the input context to a keyword extraction module.

10. The entity linking apparatus of claim 7, wherein the instructions are further configured to cause the one or more processors to:
determine the candidate entities corresponding to the entity based on an entity-candidate prior dictionary.

11. The entity linking apparatus of claim 7, wherein the instructions are further configured to cause the one or more processors to:
extract embedding vectors of the candidate entities based on a candidate embedding database.

12. The entity linking apparatus of claim 7, wherein the instructions are further configured to cause the one or more processors to:
generate the keyword-based entity information by inputting the keyword and the entity into a keyword-based entity information encoder.

13. A method comprising:
providing an input text, as an input, to a neural network-based model, the neural network-based model being configured to identify, from the input text, an entity in the input text;
based on the identified entity, obtain, from a database, candidate entity embeddings corresponding to the identified entity, the database comprising associations between entities and entity embeddings;
determining a keyword based on the input text and based on the identified entity;
generating a keyword-based embedding vector by encoding the keyword with the identified entity;
generating similarities between the keyword-based embedding vector and the candidate entity embeddings; and
selecting the candidate entity embedding with the highest similarity score to link to the entity,
wherein the identifying of the entity comprises:
obtaining a token embedding sequence and an entity span from the input context; and
determining the entity from the entity span,
wherein the determining of the keyword comprises extracting related information based on the token embedding sequence and the entity span, and
wherein the determining of the keyword further comprises determining an entity span to be the keyword based on a similarity between an embedding vector corresponding to the related information and an embedding vector of the entity span being greater than a predetermined threshold.

14. The method of claim 13, wherein the entity is identified based on a language model and a mention detection model, and wherein the key information encoder comprises a neural network.

* * * * *